US008333432B2

(12) United States Patent
Cone

(10) Patent No.: US 8,333,432 B2
(45) Date of Patent: *Dec. 18, 2012

(54) ADJUSTABLE SLIDING ARMREST

(75) Inventor: Trent J. Cone, Columbus, OH (US)

(73) Assignee: CVG Management Corporation, New Albany, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,271

(22) Filed: Mar. 5, 2012

(65) Prior Publication Data
US 2012/0212026 A1 Aug. 23, 2012

Related U.S. Application Data

(63) Continuation of application No. 12/778,436, filed on May 12, 2010, now Pat. No. 8,132,861.

(60) Provisional application No. 61/177,938, filed on May 13, 2009.

(51) Int. Cl.
B60N 2/46 (2006.01)
A47C 7/54 (2006.01)

(52) U.S. Cl. .......... 297/411.32; 297/411.35; 297/411.38

(58) Field of Classification Search ............. 297/411.32, 297/411.35, 411.38
See application file for complete search history.

(56) References Cited

U.S. PATENT DOCUMENTS

| | | | | |
|---|---|---|---|---|
| 2,841,212 | A * | 7/1958 | De Vos et al. ........ 297/411.32 X |
| 3,116,093 | A * | 12/1963 | Bosack ..................... 297/411.32 |
| 3,993,350 | A * | 11/1976 | McFarlane ............... 297/411.38 |
| 4,496,190 | A * | 1/1985 | Barley ..................... 297/411.38 |
| 4,828,323 | A * | 5/1989 | Brodersen et al. ... 297/411.38 X |
| 5,489,143 | A * | 2/1996 | Adachi et al. ............ 297/411.38 |
| 5,597,209 | A * | 1/1997 | Bart et al. ................ 297/411.38 |
| 5,769,496 | A * | 6/1998 | Gryp ......................... 297/411.32 |
| 5,927,811 | A * | 7/1999 | Tseng ................... 297/411.35 X |
| 5,931,536 | A * | 8/1999 | Wu ............................ 297/411.35 |
| 5,984,416 | A * | 11/1999 | Waldo et al. ............. 297/411.38 |
| 6,003,927 | A * | 12/1999 | Korber et al. ................ 296/37.8 |
| 6,007,155 | A * | 12/1999 | Hara et al. ................... 297/463.2 |
| 6,213,546 | B1 * | 4/2001 | Malusev et al. ............... 297/113 |
| 6,250,729 | B1 * | 6/2001 | Allison et al. ................ 312/324 |
| 6,467,847 | B2 * | 10/2002 | Bidare ..................... 297/411.32 |
| 6,554,364 | B1 * | 4/2003 | Dammermann et al. ..................... 297/411.35 X |
| 6,719,367 | B2 * | 4/2004 | Mic et al. ................. 297/188.19 |
| 7,029,049 | B2 * | 4/2006 | Rockafellow et al. ....... 296/37.8 |
| 7,104,609 | B2 * | 9/2006 | Kim .......................... 297/411.35 |
| 7,731,258 | B2 * | 6/2010 | Bazinski et al. ............. 296/37.8 |
| 7,845,732 | B2 * | 12/2010 | Liu et al. .................. 297/411.38 |
| 7,857,393 | B2 * | 12/2010 | Cebula et al. ............ 297/411.32 |
| 8,002,357 | B2 * | 8/2011 | Cebula et al. ............ 297/411.32 |
| 2007/0114829 | A1 * | 5/2007 | Wieczorek et al. ....... 297/411.35 |
| 2007/0262632 | A1 * | 11/2007 | Cody et al. ............... 297/411.35 |
| 2008/0277991 | A1 * | 11/2008 | Liu et al. .................. 297/411.36 |
| 2009/0295212 | A1 * | 12/2009 | Yamane et al. .......... 297/411.32 |

* cited by examiner

Primary Examiner — Rodney B White
(74) Attorney, Agent, or Firm — Kegler Brown Hill & Ritter; James J. Pingor

(57) ABSTRACT

An adjustable sliding armrest that may be extendable in length and varied in rotational position is provided. The armrest generally includes a support member, a slide member, a locking mechanism, and a tilt adjusting mechanism. The support member and slide member are in slidable communication with one another, and the locking mechanism may serve to lock the position of the slide member with respect to the support member. Moreover, the tilt adjusting mechanism may be utilized to selectively increase or decrease the tilt angle of the armrest. Such features allow users of various arm lengths to adjust the armrest to their comfort.

17 Claims, 19 Drawing Sheets

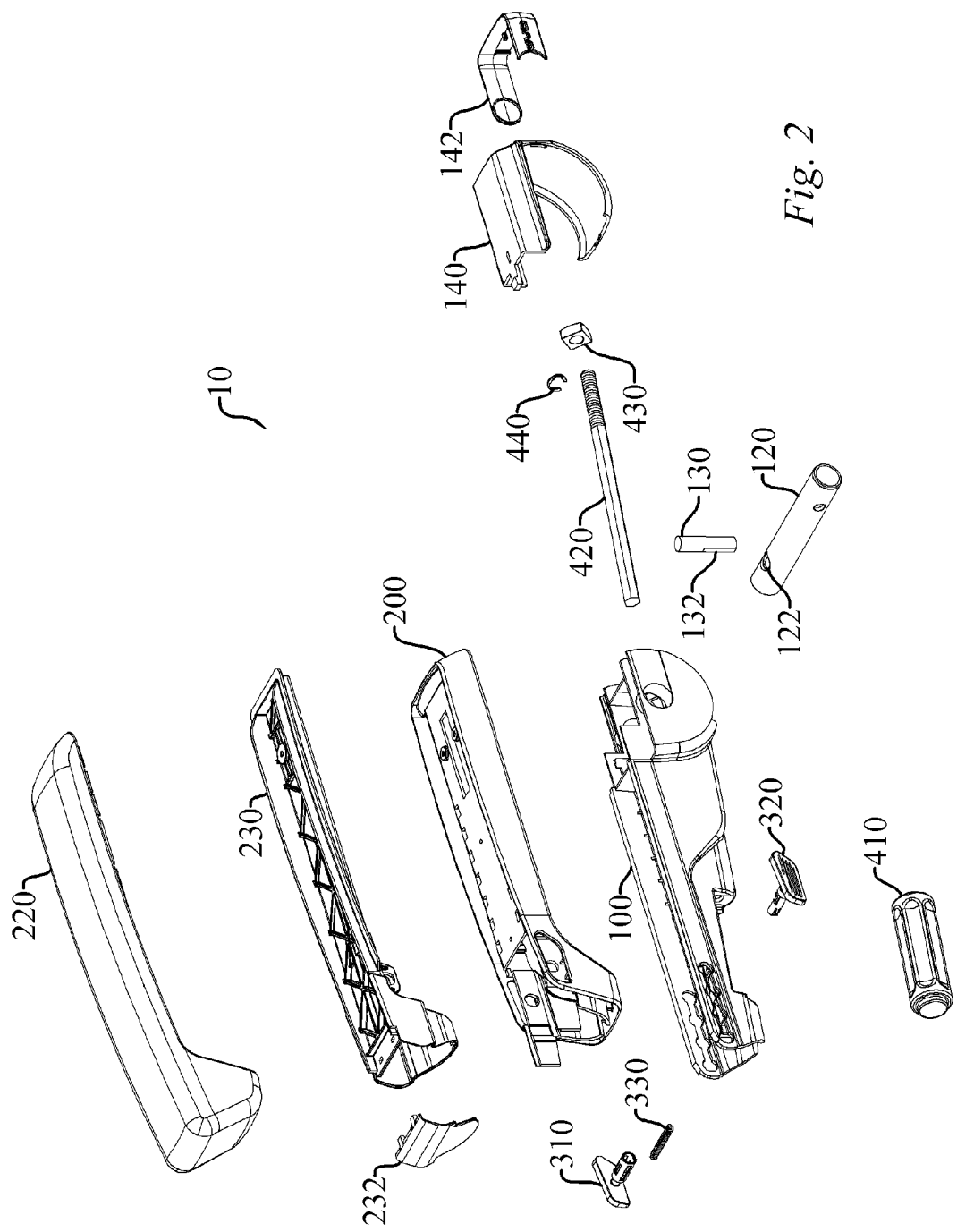

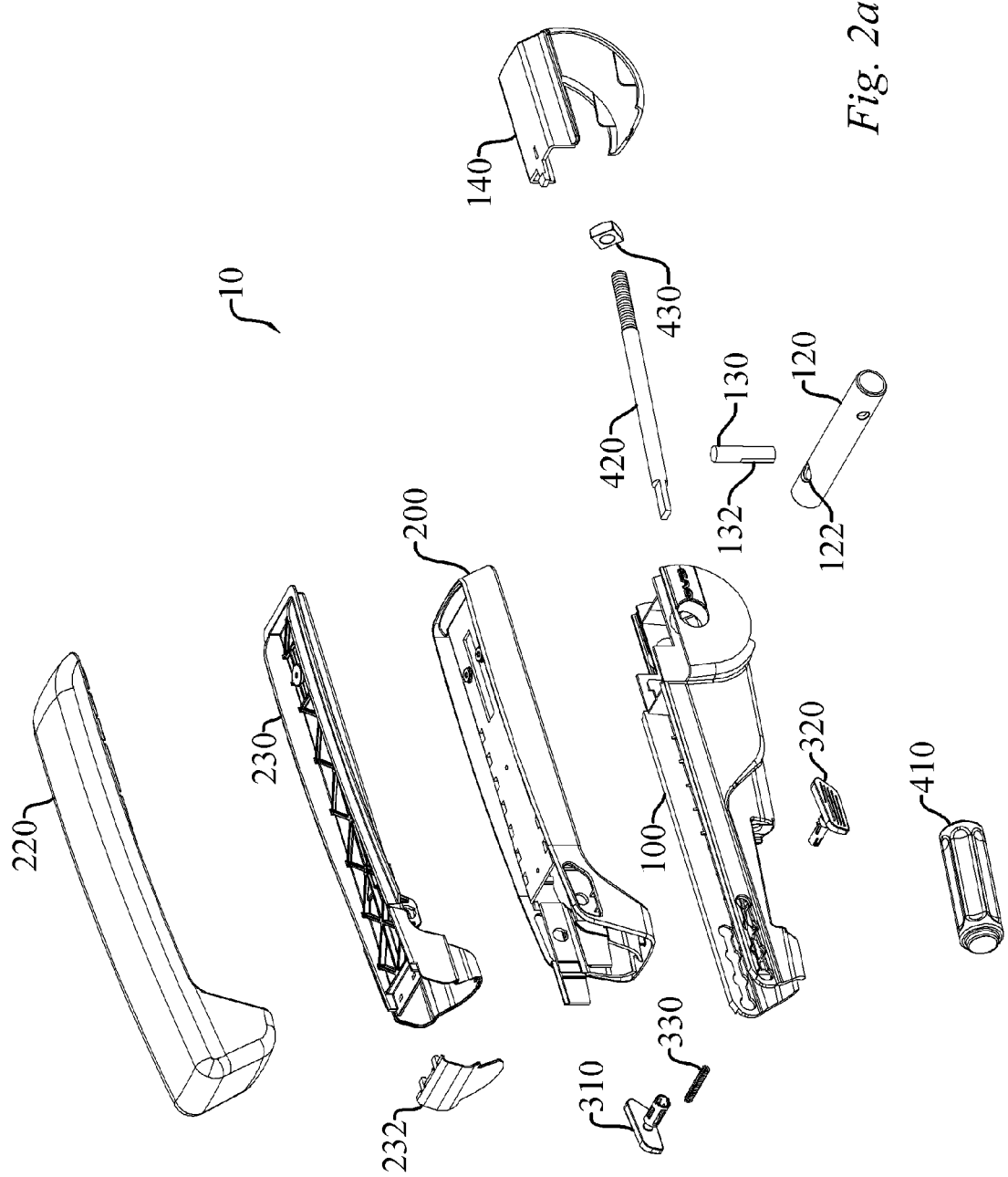

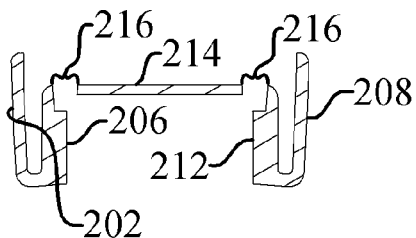
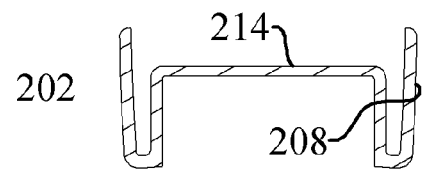
Fig. 15        Fig. 16
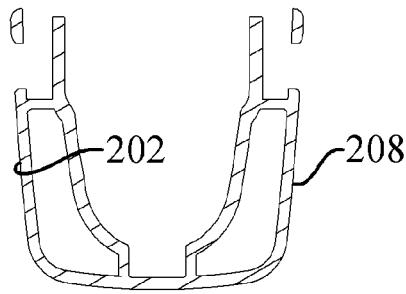
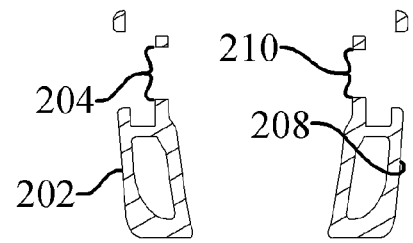
Fig. 17        Fig. 18
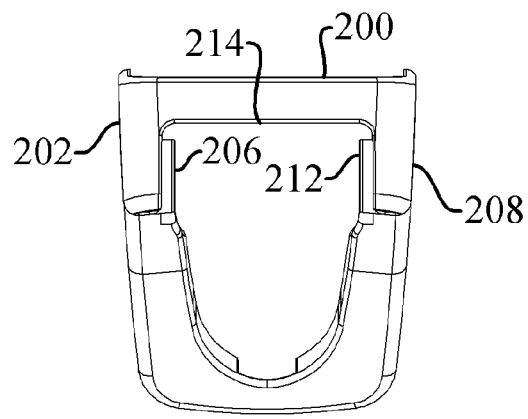
Fig. 19

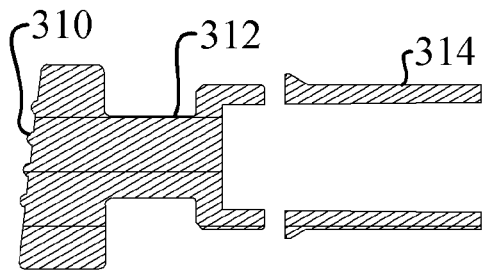
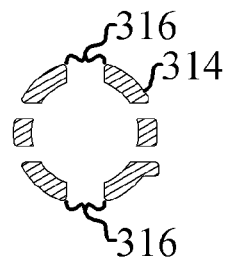
Fig. 23  Fig. 24
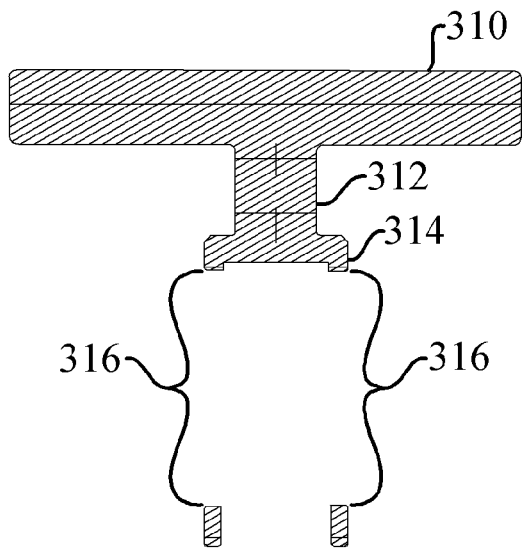
Fig. 25
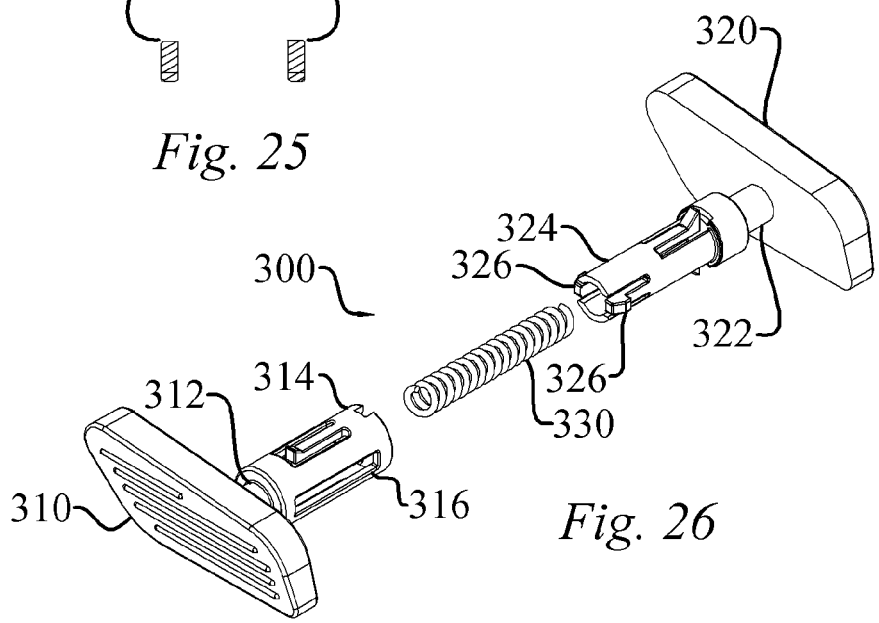
Fig. 26

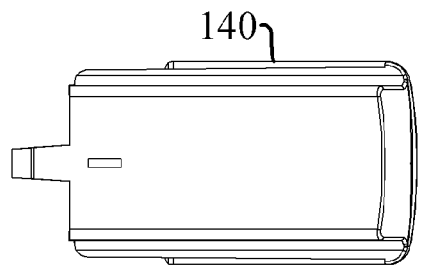
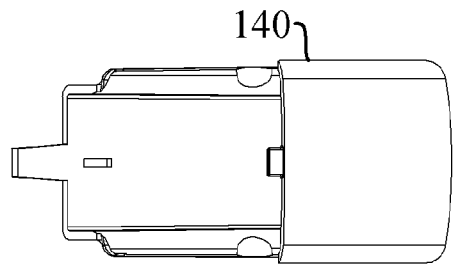
Fig. 35     Fig. 36
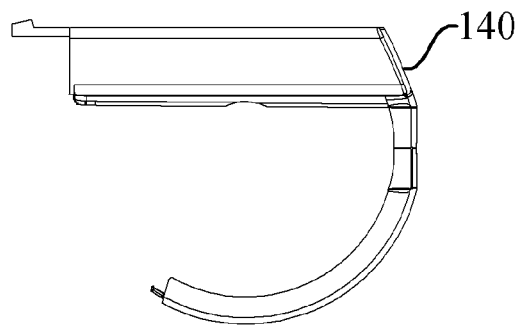
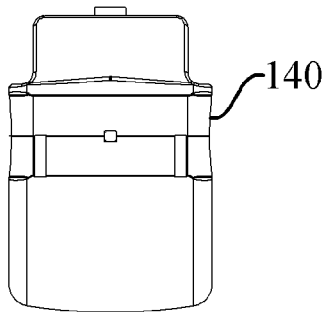
Fig. 37     Fig. 38

ADJUSTABLE SLIDING ARMREST

CROSS-REFERENCE TO RELATED APPLICATIONS

This application claims the benefit of U.S. Provisional Patent Application Ser. No. 61/177,938, filed May 13, 2009, and this application is a continuation of U.S. patent application Ser. No. 12/778,436 filed May 12, 2010, now U.S. Pat. No. 8,132,861 B2, the entireties of both of which are incorporated by reference as if completely written herein.

STATEMENT REGARDING FEDERALLY SPONSORED RESEARCH OR DEVELOPMENT

Not applicable.

TECHNICAL FIELD

The present disclosure relates generally to the field of adjustable sliding armrests and, more particularly, to an armrest which may be extendable in length and varied in rotational position.

BACKGROUND OF THE INVENTION

Persons forced to sit in seats for long periods of time, particularly vehicle operators such as long-haul truckers, find greater comfort and therefore increased safety, when vehicle seats are equipped with ergonomically designed armrests. Such armrests optimally require multiple functions, such as the capacity to be rotated out of the way of a person entering and exiting the seat, the ability to be adjusted for persons of differing arm lengths, and the ability to be positioned at different angles to the horizontal, as may be desired by the occupant.

Various embodiments of the adjustable sliding armrest disclosed herein provide these functions in a novel design that promotes comfort and durability in any one of a number of different embodiments.

SUMMARY OF THE INVENTION

In its most general configuration, the presently disclosed adjustable sliding armrest advances the state of the art with a variety of new capabilities and overcomes many of the shortcomings of prior methods in new and novel ways. In its most general sense, the presently disclosed adjustable sliding armrest overcomes the shortcomings and limitations of the prior art in any of a number of generally effective configurations.

The adjustable sliding armrest is designed and configured such that users of various arm lengths may comfortably support their arm by utilizing the adjustable features of the armrest. The armrest may be used for any type of application where support of a user's arm is desired. By way of example, and not limitation, the armrest may be used in various vehicles, including trucks, buses, coaches, military, construction and agricultural equipment, automobiles, boats, and airplanes, as well as any type of furniture that typically includes arm supports, such as chairs and sofas.

The armrest generally includes a support member, a slide member, a locking mechanism, and a tilt adjusting mechanism. These components, as well as other components, and the operation of the armrest, will be described in detail below.

The support member may include a rear cover, and a rear cover attachment that helps secure the rear cover to the support member. Although the rear cover and rear cover attachment are shown as separate components in many embodiments that attach to the support member, the support member may be formed with an integral rear cover and rear cover attachment, thus forming an integral rear cover.

The adjustable sliding armrest provides a number of advantages. For example, as mentioned, the sliding feature of the armrest allows users of various arm lengths to adjust the armrest to their comfort. Additionally, the configuration of the slide member and the support member promotes a self-cleaning function to help prevent fouling of the slidable communication therebetween. The adjustable sliding armrest further promotes ergonomics by utilization of a tilt adjusting mechanism, which allows for selective, incremental adjustments to the armrest tilt angle. Moreover, a rounded or domed contact surface of the threaded rod helps distribute the force exerted on the bearing pin over a larger surface area, which helps increase the useful life of the bearing pin.

Numerous variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the adjustable sliding armrest as disclosed herein and referring now to the drawings and figures:

FIG. 2 shows an exploded view of an embodiment of an adjustable sliding armrest, not to scale;

FIG. 2a shows an exploded view of another embodiment of an adjustable sliding armrest, not to scale;

FIG. 15 shows a cross-sectional view of the slide member taken along section line 15-15 of FIG. 12, not to scale;

FIG. 16 shows a cross-sectional view of the slide member taken along section line 16-16 of FIG. 12, not to scale;

FIG. 17 shows a cross-sectional view of the slide member taken along section line 17-17 of FIG. 12, not to scale;

FIG. 18 shows a cross-sectional view of the slide member taken along section line 18-18 of FIG. 12, not to scale;

FIG. 19 shows a front elevation view of an embodiment of a slide member of the adjustable sliding armrest, not to scale;

FIG. 23 shows a cross-sectional view of the dextral button taken along section line 23-23 of FIG. 22, not to scale;

FIG. 24 shows a cross-sectional view of a portion of the dextral button taken along section line 24-24 of FIG. 22, not to scale;

FIG. 25 shows a cross-sectional view of the dextral button taken along section line 25-25 of FIG. 20, not to scale;

FIG. 26 shows an exploded view of an embodiment of a biased locking mechanism of the adjustable sliding armrest, not to scale;

FIG. 35 shows a top plan view of an embodiment of a rear cover of the adjustable sliding armrest, not to scale;

FIG. 36 shows a bottom plan view of an embodiment of a rear cover of the adjustable sliding armrest, not to scale;

FIG. 37 shows a side elevation view of an embodiment of a rear cover of the adjustable sliding armrest, not to scale;

FIG. 38 shows a rear elevation view of an embodiment of a rear cover of the adjustable sliding armrest, not to scale;

Figure 1:
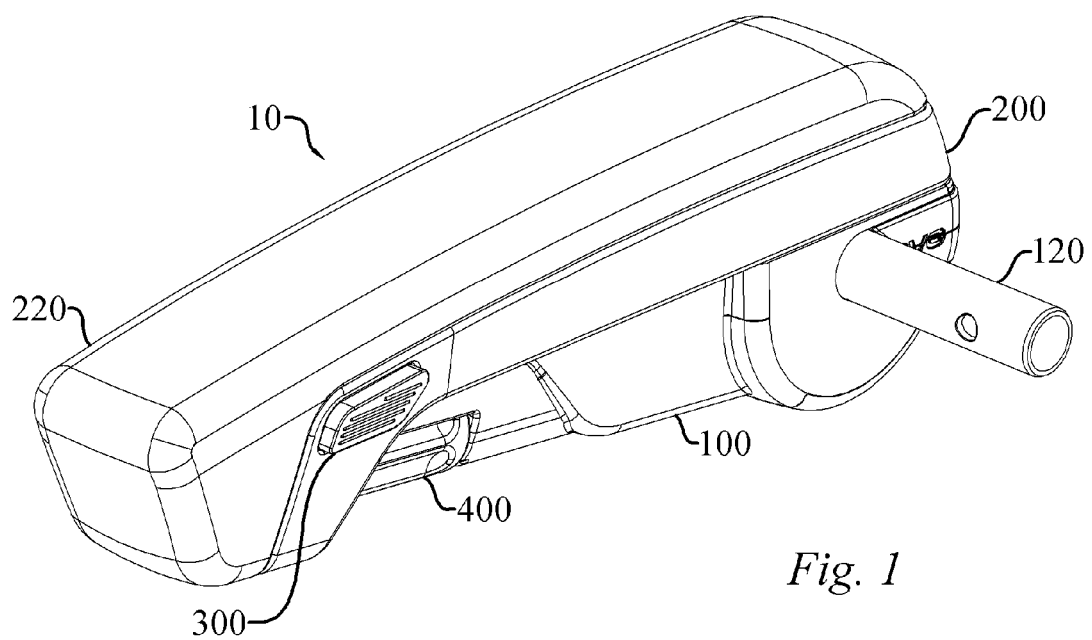
FIG. 1 shows a perspective view of an embodiment of an adjustable sliding armrest, not to scale.

These drawings are provided to assist in the understanding of the exemplary embodiments of the invention as described in more detail below and should not be construed as unduly limiting the adjustable sliding armrest. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The presently disclosed adjustable sliding armrest (10) enables a significant advance in the state of the art. The preferred embodiments of the adjustable sliding armrest (10) accomplish this by new and novel arrangements of elements and methods that are configured in unique and novel ways and which demonstrate previously unavailable but preferred and desirable capabilities. The description set forth below in connection with the drawings is intended merely as a description of the presently preferred embodiments of the adjustable sliding armrest (10), and is not intended to represent the only form in which the adjustable sliding armrest (10) may be constructed or utilized. The description sets forth the designs, functions, means, and methods of implementing the adjustable sliding armrest (10) in connection with the illustrated embodiments. It is to be understood, however, that the same or equivalent functions and features may be accomplished by different embodiments that are also intended to be encompassed within the spirit and scope of the claimed adjustable sliding armrest (10).

With reference generally to FIGS. 1-51, an adjustable sliding armrest (10) is shown. The armrest (10) is designed and configured such that users of various arm lengths may comfortably support their arm by utilizing the adjustable features of the armrest (10). The armrest (10) may be used for any type of application where support of a user's arm is desired. By way of example, and not limitation, the armrest (10) may be used in various vehicles, including trucks, buses, coaches, military, construction and agricultural equipment, automobiles, boats, and airplanes, as well as any type of furniture that typically includes arm supports, such as chairs and sofas.

Referring now to FIG. 1, the armrest (10) generally includes a support member (100), a slide member (200), a biased locking mechanism (300), and a tilt adjusting mechanism (400). These components, as well as other components, and the operation of the armrest (10), will be described in detail below.

An exploded view of an embodiment of the armrest (10) is shown in FIG. 2. In this embodiment, the support member (100) includes a rear cover (140), which is best seen in FIGS. 35-38, and a rear cover attachment (142) that helps secure the rear cover (140) to the support member (100). Preferably, the rear cover (140) and rear cover attachment (142) are secured to the support member (100) via a snap-fit connection. Although the rear cover (140) and rear cover attachment (142) are shown as separate components that attach to the support member (100), the support member (100) may be formed with an integral rear cover (140) and rear cover attachment (142), thus forming an integral rear cover (140) as seen in FIG. 2a. This embodiment also includes a topper pad (220), a topper insert (230), which is best seen in FIGS. 39-44, and a topper attachment (232) to help secure the topper pad (220) to the topper insert (230). The combined topper pad (220) and topper insert (230) are configured to be secured to the slide member (200) via fasteners, such as screws or nuts and bolts, or even a snap-fit connection. The topper pad (220) provides cushioning and may be constructed of any type of foam material having soft and elastic qualities, such as a polyurethane foam. The topper insert (230) serves as a support for the topper pad (220) as well as a base for connecting the topper pad (220) to the slide member (200). The topper insert (230) may be constructed with any type of durable plastic, such as polycarbonate or acrylonitrile butadiene styrene, just to name a couple. Although the topper pad (220), the topper insert (230), and the topper insert attachment (232) are shown as separate components, the topper insert (230) and topper insert attachment (230) may be molded or adhered to the topper pad (220) to form one integral piece.

Figure 3:
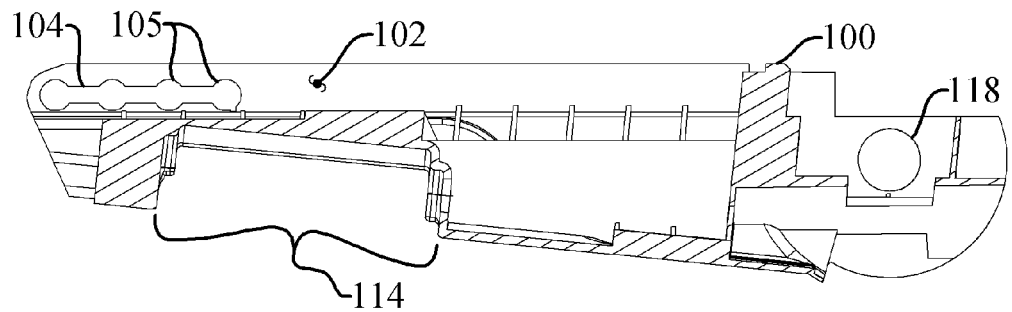
FIG. 3 shows a cross-sectional view of an embodiment of a support member of the adjustable sliding armrest, not to scale.
Figure 4:
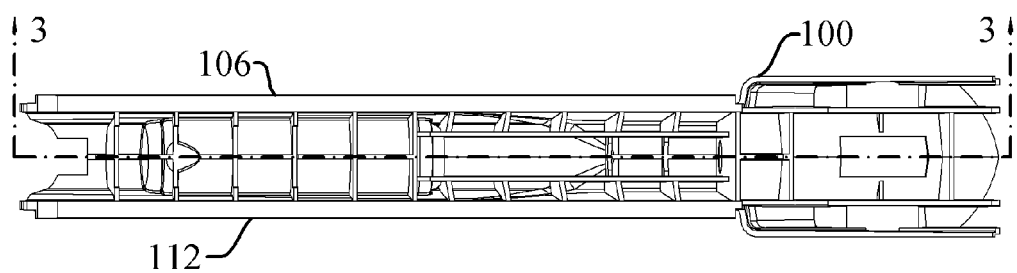
FIG. 4 shows a top plan view of an embodiment of a support member of the adjustable sliding armrest, not to scale.
Figure 5:
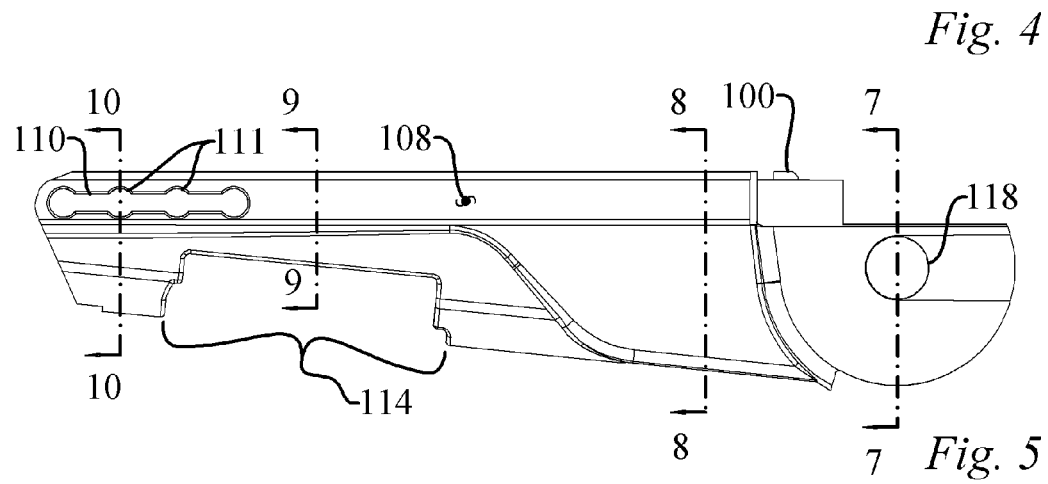
FIG. 5 shows a side elevation view of an embodiment of a support member of the adjustable sliding armrest, not to scale.
Figure 8:
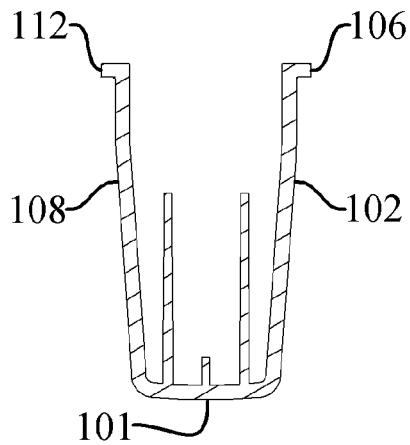
FIG. 8 shows a cross-sectional view of the support member taken along section line 8-8 of FIG. 5, not to scale.
Figure 9:
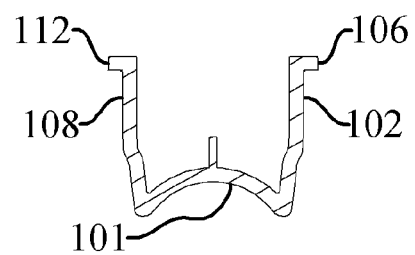
FIG. 9 shows a cross-sectional view of the support member taken along section line 9-9 of FIG. 5, not to scale.
Figure 10:
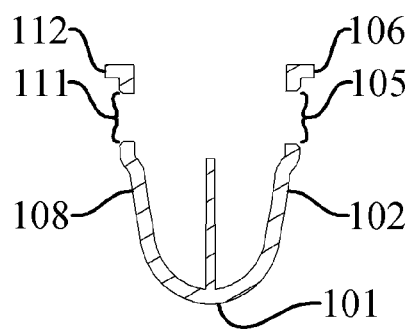
FIG. 10 shows a cross-sectional view of the support member taken along section line 10-10 of FIG. 5, not to scale.

With reference now to FIGS. 3-10, the support member (100) is shown in greater detail. The support member (100) includes a support member dextral wall (102) having a support member dextral wall slide slot (104) and a support member dextral rail (106), as seen in FIGS. 3 and 4. The support member dextral wall slide slot (104) has a plurality of dextral wall slide slot locking apertures (105), which will be discussed in more detail below. Similarly, the support member (100) includes a support member sinistral wall (108) having a support member sinistral wall slide slot (110) and a support member sinistral rail (112), as seen in FIGS. 4 and 5. As with the support member dextral wall slide slot (104), the support member sinistral wall slide slot (110) also includes a plurality of sinistral wall slide slot locking apertures (111), which will also be discussed in connection with the plurality of dextral wall slide slot locking apertures (105) in more detail below. Additionally, as seen in FIGS. 8-10, the support member (100) may include a support member bottom wall (101). The support member (100) may be constructed with any type of durable plastic material, such as polycarbonate, acrylonitrile butadiene styrene, nylon 6 with 30% glass-fiber filled, just to name a few.

Figure 6:
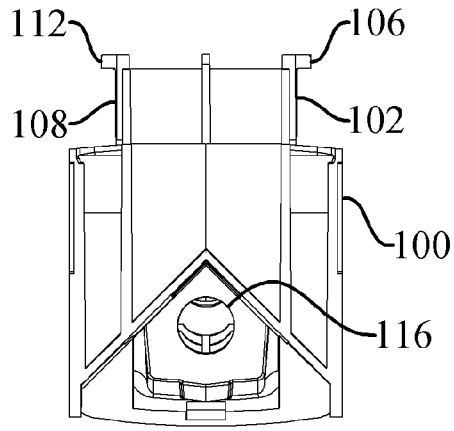
FIG. 6 shows a rear elevation view of an embodiment of a support member of the adjustable sliding armrest, not to scale.
Figure 7:
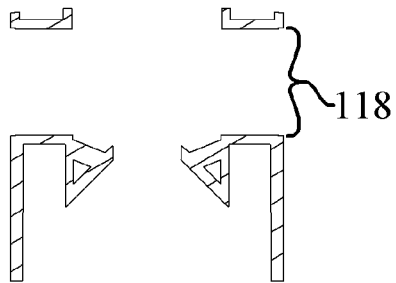
FIG. 7 shows a cross-sectional view of the support member taken along section line 7-7 of FIG. 5, not to scale.

Referring now to FIG. 5, the support member (100) includes a handle recess (114). The handle recess (114) is configured to receive a rotating handle (410), which is a component of the tilt adjusting mechanism (400). The support member (100) also includes a rod bore (116), which is best seen in FIG. 6. The rod bore (116) is configured to receive a threaded rod (420), which is an additional component of the tilt adjusting mechanism (400).

Still referring to FIG. 5, the support member (100) has a pivot bore (118). The pivot bore (118) is configured to receive and retain a pivot tube (120) having a bearing bore (122), which is best seen in FIG. 2. The bearing bore (122) is configured to receive and retain a bearing pin (130), also seen in FIG. 2, and while not illustrated in the figure, the cooperating surfaces of the bearing bore (122) and bearing pin (130) may have knurling or other cooperating surface features in order to facilitate a snug fit. In operation, the pivot tube (120) provides an axis around which the support member (100) may rotate. As seen in FIG. 1, in one embodiment, the pivot tube (120) extends beyond the support member (100) to serve as a means for securing the armrest (10) to an object for which arm support is desired. The pivot tube (120) may be formed with various strong and durable materials, such as stainless steel, titanium, 1020 DOM steel, and various plastics, just to name a few.

Figure 11:
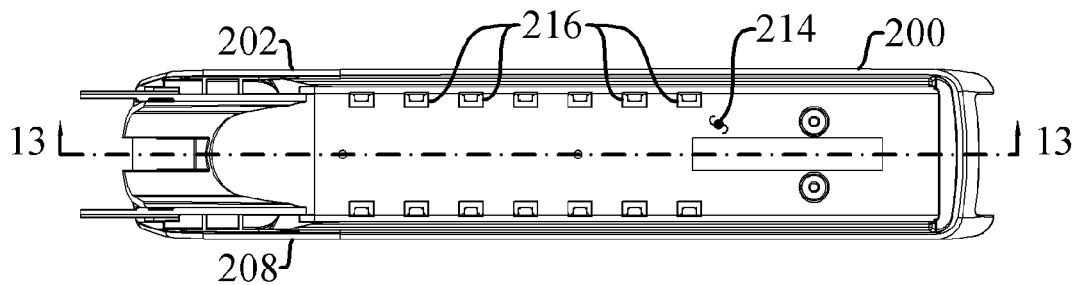
FIG. 11 shows a top plan view of an embodiment of a slide member of the adjustable sliding armrest, not to scale.
Figure 12:
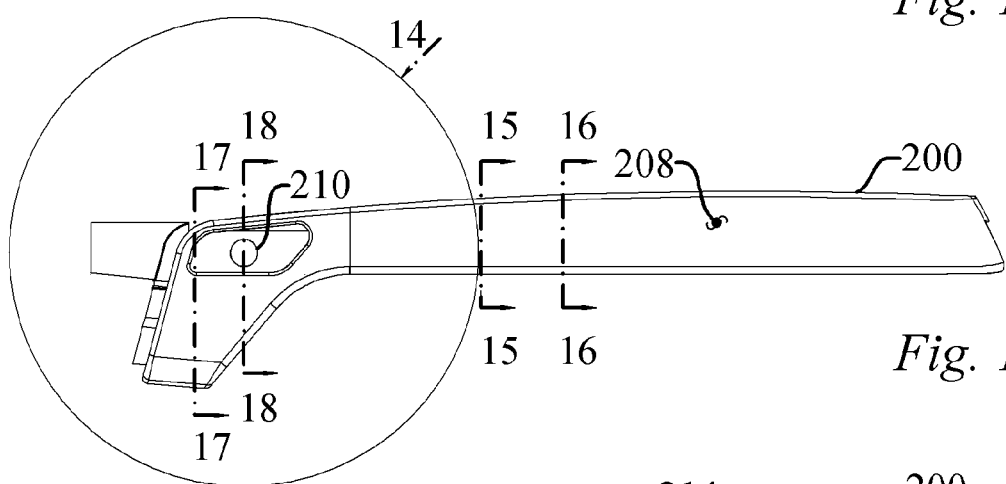
FIG. 12 shows a side elevation view of an embodiment of a slide member of the adjustable sliding armrest, not to scale.
Figure 13:
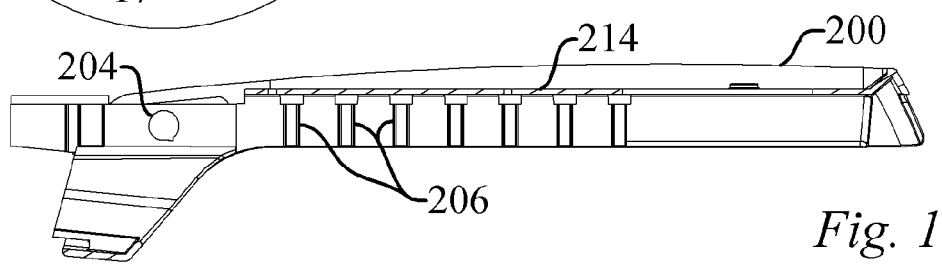
FIG. 13 shows a cross-sectional view of the slide member taken along section line 13-13 of FIG. 11, not to scale.
Figure 14:
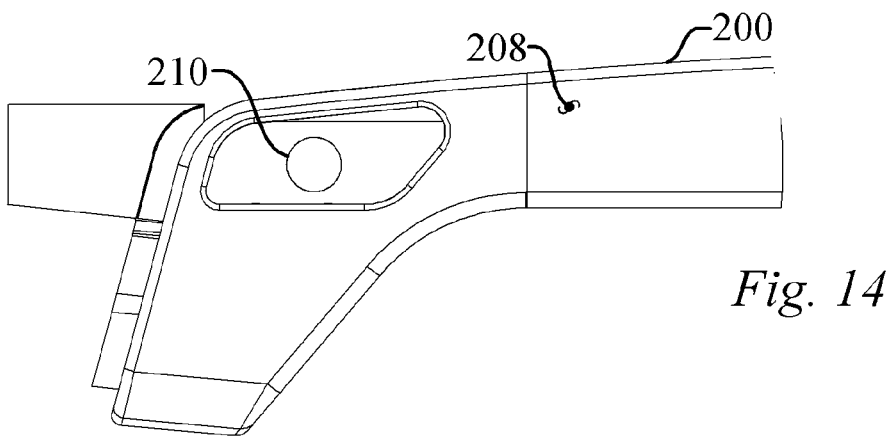
FIG. 14 shows an enlarged view of a portion of the slide member shown in FIG. 12, not to scale.
Figure 20:
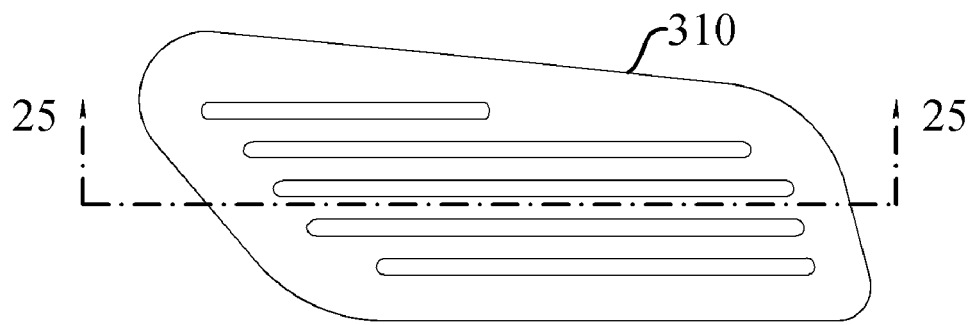
FIG. 20 shows a front elevation view of an embodiment of a dextral button of the adjustable sliding armrest, not to scale.

With reference now to FIGS. 11-19, the slide member (200) will now be discussed. As seen throughout all of the figures, and FIG. 45 in particular, the slide member (200) is constructed for slidable communication with the support member (100). The slide member (200) includes a slide member dextral wall (202) having a slide member dextral wall button bore (204) and a slide member dextral rail engager (206) for slidably engaging the support member dextral rail (106), as seen in FIGS. 11 and 13. Similarly, the slide member (200) includes a slide member sinistral wall (208) having a slide member sinistral wall button bore (210) and a slide member sinistral rail engager (212) for slidably engaging the support member sinistral rail (112), as seen in FIGS. 14 and 15. Additionally, the slide member (200) includes a slide member top wall (214), as seen in FIG. 11. The material of construction of the slide member (200) is preferably the same as that of the support member (100) discussed above.

As seen throughout the figures, the slide member dextral and sinistral rail engagers (206, 212) are shown as a plurality of rail engagers (206, 212) spaced along the slide member dextral and sinistral walls (202, 208). However, there need only be one slide member dextral rail engager (206) on the slide member dextral wall (202) and one slide member sinistral rail engager (212) on the slide member sinistral wall (208).

On the other hand, having a plurality of rail engagers (206, 212) can lead to smoother sliding engagement with the support member dextral and sinistral rails (106, 112). When used over a period of time, dust or debris may tend to build up on the dextral and sinistral rails (106, 112) and the slide member dextral and sinistral rail engagers (206, 212). Utilizing a plurality of rail engagers (206, 212) allows the dextral and sinistral rails (106, 112) to push out the accumulated dust or debris, which would fall in the space between the adjacent rail engagers (206, 212) positioned on the slide member dextral and sinistral walls (202, 208). Thus, having a plurality of rail engagers (206, 212) provides a self-cleaning function, which helps prevent the slidable communication between the slide member (200) and the support member (100) from becoming fouled.

In one particular embodiment, the slide member (200) may include one or more debris recesses (216) in the slide member top wall (214), as seen in FIG. 11. The debris recesses (216) will allow any dust or debris that may collect on the slide member top wall (214) to fall through and exit the armrest (10).

Figure 45:
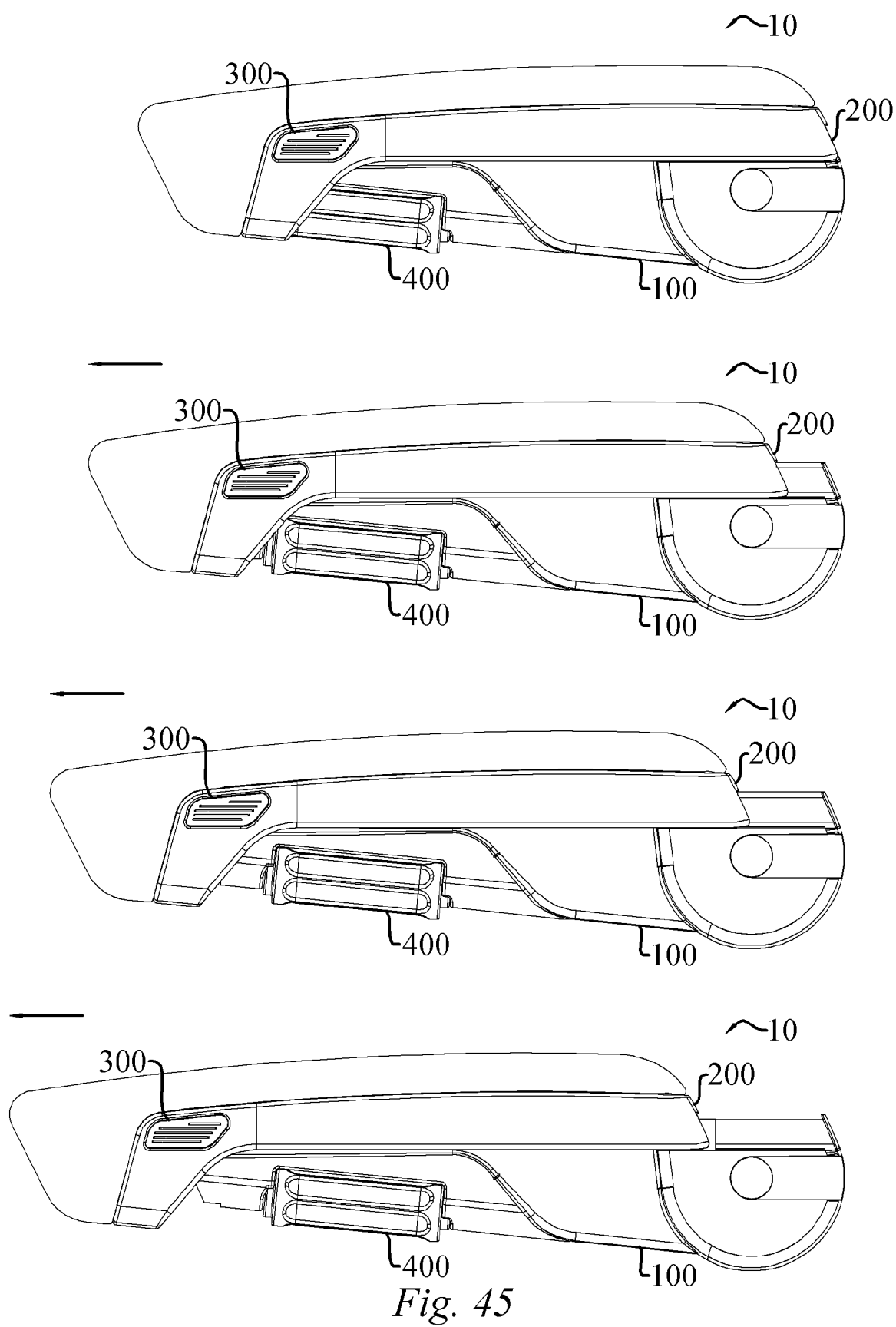
FIG. 45 shows, in sequence, the sliding motion of the adjustable sliding armrest, not to scale.

With reference now to FIGS. 20-29, the biased locking mechanism (300) will be discussed. In operation, the biased locking mechanism (300) allows selective slidable extension of the slide member (200) with respect to the support member (100), as best seen in FIG. 45. The biased locking mechanism (300) includes a dextral button (310) configured to extend through the slide member dextral wall button bore (204) and the support member dextral wall slide slot (104), as seen in FIGS. 20-26. Additionally, the biased locking mechanism (300) includes a sinistral button (320) configured to extend through the slide member sinistral wall button bore (210) and the support member sinistral wall slide slot (110), as seen in FIGS. 26-29. The dextral and sinistral buttons (310, 320) may be formed with various materials, including, but not limited to, various metals and durable plastics, such as stainless steel, carbon steel, polycarbonate, and acrylonitrile butadiene styrene, just to name a few.

To provide the biased locking mechanism (300) with means for creating a biasing force, a biasing spring (330) is disposed between the dextral button (310) and the sinistral button (320), as seen in one embodiment shown in FIG. 26. The biasing spring (330) serves to bias the dextral button (310) into engagement with one of the plurality of dextral wall slide slot locking apertures (105) and to bias the sinistral button (320) into engagement with one of the plurality of sinistral wall slide slot locking apertures (111) to lock the position of the slide member (200) with respect to the support member (100). Although the biasing spring (330) is shown throughout the figures as a compression spring, one with skill in the art will recognize that any type of biasing means may be utilized, such as a leaf spring, a flat spring, and a torsion spring, just to name a few.

Alternatively, the biasing spring (330) may be two resilient members that extend from the support member dextral sidewall (102) and the support member sinistral sidewall (108), or the support member bottom wall (101). The two resilient members extend to a height that is at least level with the midpoint of the dextral and sinistral wall slide slot locking apertures (105, 111). Thus, at least a portion of the dextral and sinistral buttons (310, 320) will be capable of compressing the two resilient members and the two resilient members will be capable of biasing the dextral and sinistral buttons (310, 320) back to their original position.

As previously discussed, the slide member (200) is in slidable communication with the support member (100). This slidable communication is possible by way of the interaction between the support member dextral and sinistral rails (106, 112) and the slide member top wall (214), as well as the slide member dextral and sinistral rail engagers (206, 212). The slide member dextral and sinistral rail engagers (206, 212) engage the support member dextral and sinistral rails (106, 112) and help prevent the slide member (200) from being lifted off of the support member (100). The slidable communication between the slide member (200) and the support member (100) is also attributable to the fact that the dextral and sinistral buttons (310, 320) extend through the slide member dextral and sinistral wall button bores (204, 210) and the support member dextral and sinistral wall slide slots (104, 110). Thus, as can be appreciated, the biased locking mechanism (300) not only allows selective slidable extension of the slide member (200) with respect to the support member (100), it also serves as a means for connecting the slide member (200) and the support member (100).

Now, the sliding operation of the armrest (10) will be described. First, a compressive force is applied to the dextral and sinistral buttons (310, 320) to cause the biasing spring (330) to compress. In the compressed state, the dextral button (310) and the sinistral button (320) disengage the dextral and sinistral wall slide slot locking apertures (105, 111). This disengagement allows the dextral and sinistral buttons (310, 320) to slide unhindered along the support member dextral and sinistral wall slide slots (104, 110). Thus, when a compressive force is continuously applied to the dextral and sinistral buttons (310, 320), the slide member (200) may freely slide with respect to the support member (100) in order to extend or retract the slide member (200). However, after the compressive force is removed from the dextral and sinistral buttons (310, 320), the dextral and sinistral buttons (310, 320) are permitted to slide along the support member dextral and sinistral wall slide slots (104, 110) until the biasing spring (330) biases the dextral and sinistral buttons (310, 320) back into engagement with one of the plurality of dextral and sinistral wall slide slot locking apertures (105, 111) to lock the position of the slide member (200) with respect to the support member (100). As one with skill in the art will appreciate, the distance the armrest (10) may extend is a function of the length of the support member dextral and sinistral wall slide slots (104, 110).

Figure 21:
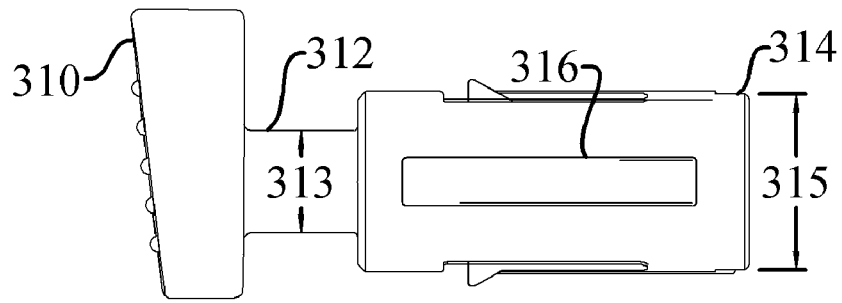
FIG. 21 shows a side elevation view of an embodiment of a dextral button of the adjustable sliding armrest, not to scale.
Figure 22:
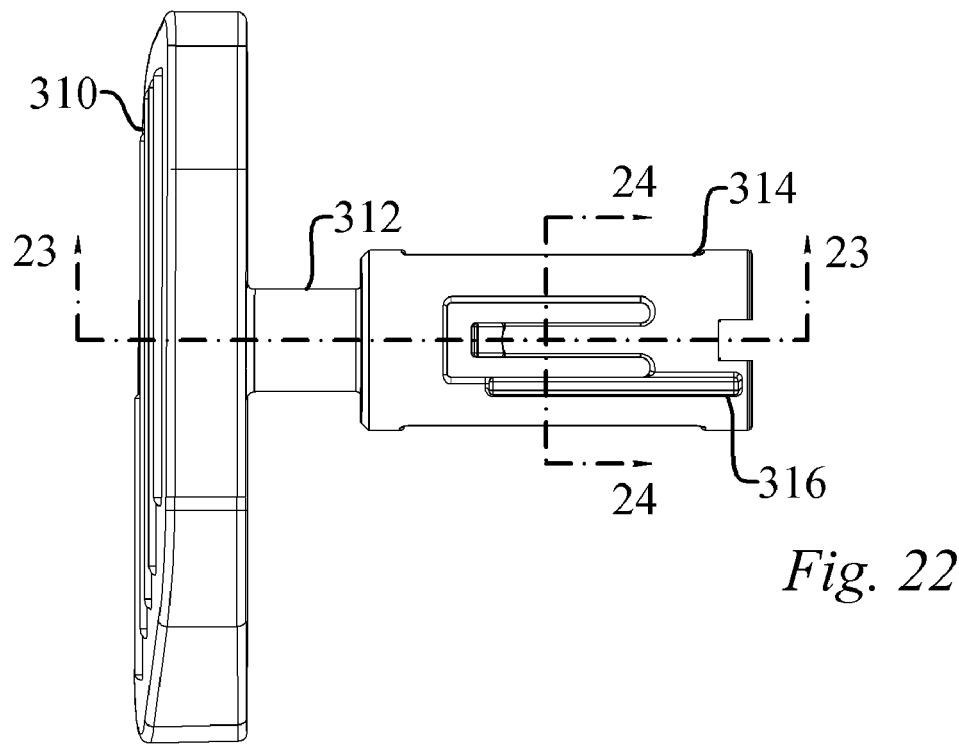
FIG. 22 shows a bottom plan view of an embodiment of a dextral button of the adjustable sliding armrest, not to scale.
Figure 27:
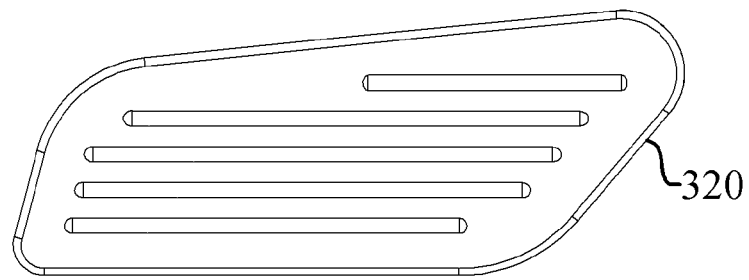
FIG. 27 shows a front elevation view of an embodiment of a sinistral button of the adjustable sliding armrest, not to scale.

In one particular embodiment of the biased locking mechanism (300), the dextral button (310) includes a dextral shaft (312) having a dextral shaft width (313) and a dextral housing (314) having a dextral housing width (315) joined to the dextral shaft (312), as seen in FIG. 21. The dextral housing (314) further includes a keyway (316), also seen in FIG. 21. Similarly, in this embodiment, the sinistral button (320) includes a sinistral shaft (322) having a sinistral shaft width (323) and a sinistral housing (324) having a sinistral housing width (325) joined to the sinistral shaft (322). The sinistral housing (324) further includes a key (326) configured to engage the keyway (316) of the dextral housing (316) such that the dextral housing (314) and the sinistral housing (324) are joined to one another. In this particular embodiment, the biasing spring (330) is disposed within the dextral and sinistral housings (314, 324) to enclose the biasing spring (330) and help guide the biasing spring (330) as it is compressed. As seen in FIG. 26, the dextral and sinistral housings (314, 324) are joined by a snap-fit connection; however, one with skill in the art will recognize that other connection means are possible. For example, the dextral and sinistral housings (314, 324) may simply be joined to one another by the biasing spring (330), i.e., one end of the biasing spring (330) is fixedly secured to the dextral housing (314) and the other end of the biasing spring (330) is fixedly secured to the sinistral housing (324).

Figure 28:
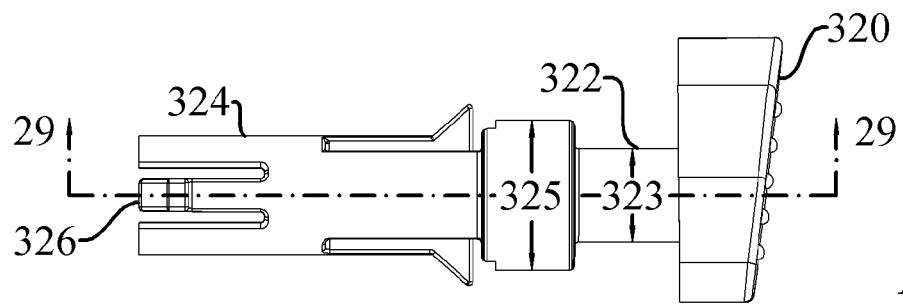
FIG. 28 shows a side elevation view of an embodiment of a sinistral button of the adjustable sliding armrest, not to scale.
Figure 29:
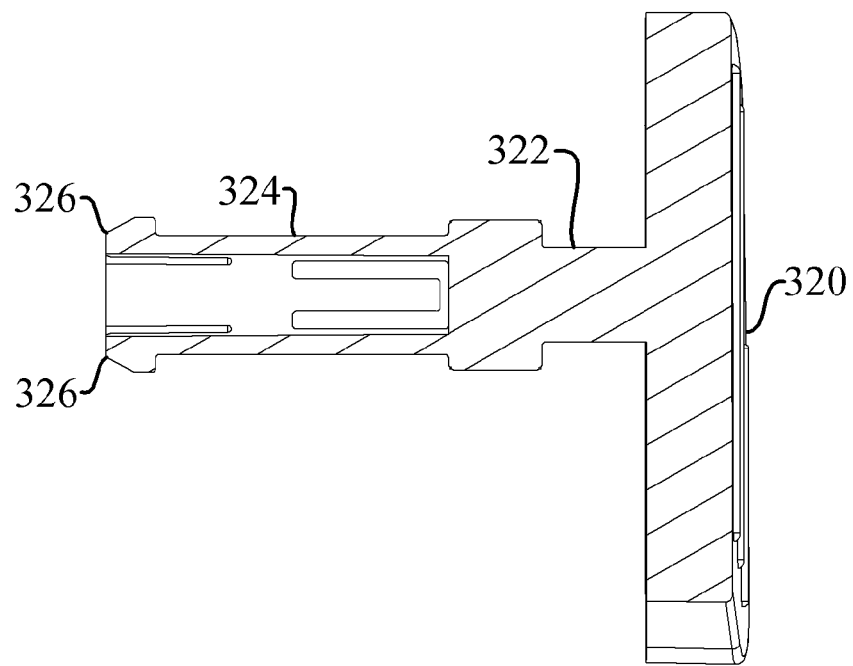
FIG. 29 shows a cross-sectional view of the sinistral button taken along section line 29-29 of FIG. 28, not to scale.

As discussed above, the dextral and sinistral shafts (312, 322) have shaft widths (313, 323) and the dextral and sinistral housings (314, 324) have housing widths (315, 325), as seen in FIGS. 21 and 28. In this particular embodiment, the shaft widths (313, 323) are configured to fit within the widths of the support member dextral and sinistral slide slots (104, 110). However, the housing widths (315, 325) are larger than the shaft widths (313, 323) and will not fit within the support member dextral and sinistral slide slots (104, 110); rather, the housing widths (315, 325) are configured to only fit within the widths of the dextral and sinistral wall slide slot locking apertures (105, 111). Thus, when the dextral and sinistral buttons (310, 320) are compressed, the dextral and sinistral housings (314, 324) disengage the dextral and sinistral wall slide slot locking apertures (105, 111). This disengagement allows the dextral and sinistral shafts (312, 322) to slide unhindered along the support member dextral and sinistral wall slide slots (104, 110) until another dextral and sinistral wall slide slot locking aperture (105, 111) is reached. At this point, the biasing spring (330) will act to bias the dextral and sinistral housings (314, 324) into engagement with the dextral and sinistral wall slide slot locking apertures (105, 111).

Figure 46:
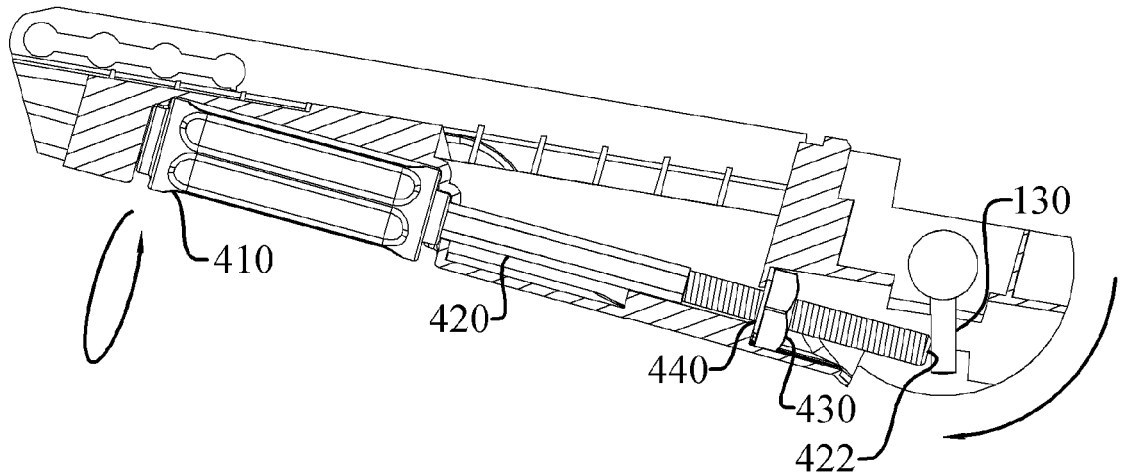
FIG. 46 shows a portion of an embodiment of an adjustable sliding armrest with an increased tilt angle, not to scale.
Figure 47:
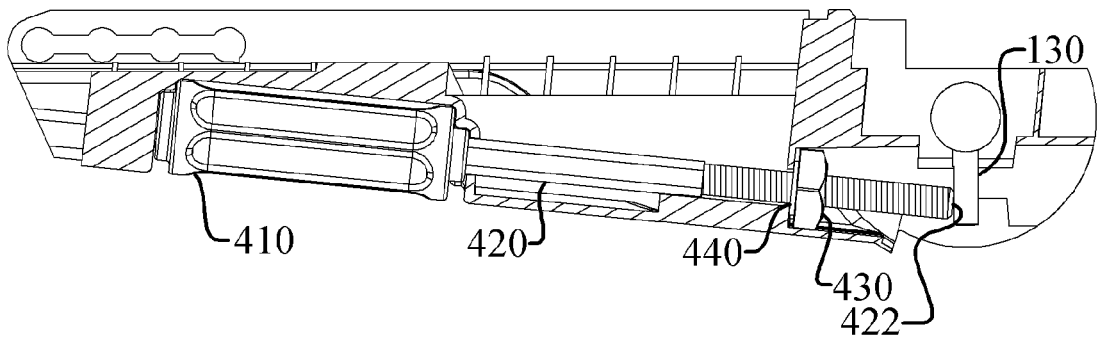
FIG. 47 shows a portion of an embodiment of an adjustable sliding armrest with a level tilt angle, not to scale.
Figure 48:
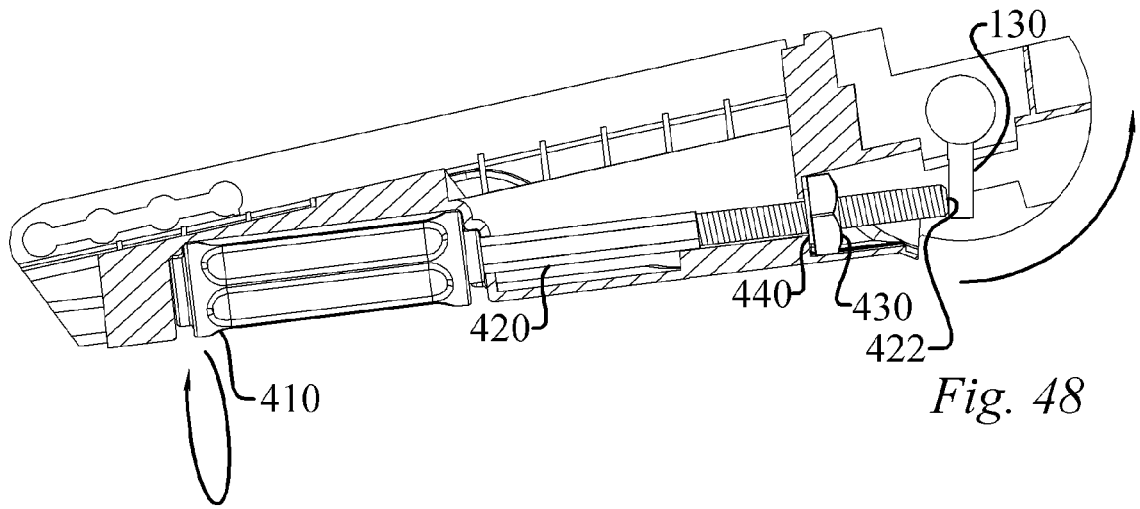
FIG. 48 shows a portion of an embodiment of an adjustable sliding armrest with a decreased tilt angle, not to scale.

With reference now to FIGS. 30-34 and FIGS. 46-51, the tilt adjusting mechanism (400) will be described. The tilt adjusting mechanism (400) allows a tilt angle of the armrest (10) to be selectively increased or decreased, as illustrated in FIGS. 46-48. As seen in FIGS. 30-34, the tilt adjusting mechanism (400) includes a rotating handle (410) having a handle bore (412). As previously discussed, the rotating handle (410) is configured to be received within the handle recess (114) of the support member (100). The rotating handle (410) may be formed from virtually any metal or plastic material, such as acrylonitrile butadiene styrene or polypropylene, just to name a couple.

Figure 30:
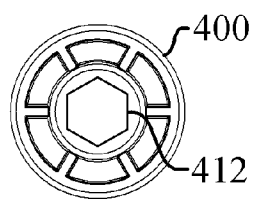
FIG. 30 shows a side elevation view of an embodiment of a rotating handle of the adjustable sliding armrest, not to scale.
Figure 32:
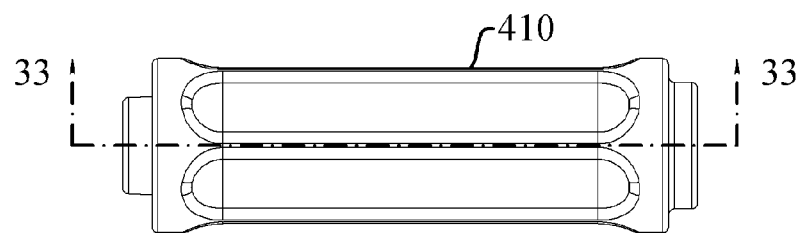
FIG. 32 shows a top plan view of an embodiment of a rotating handle of the adjustable sliding armrest, not to scale.
Figure 31:
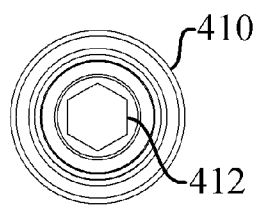
FIG. 31 shows a side elevation view of an embodiment of a rotating handle of the adjustable sliding armrest, not to scale.
Figure 33:
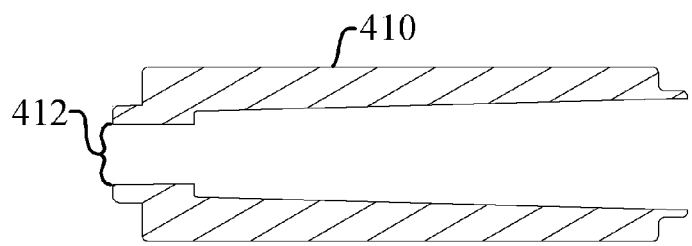
FIG. 33 shows a cross-sectional view of the rotating handle taken along section line 33-33 of FIG. 32, not to scale.
Figure 34:
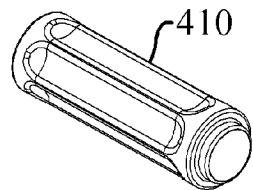
FIG. 34 shows a perspective view of an embodiment of a rotating handle of the adjustable sliding armrest, not to scale.
Figure 39:
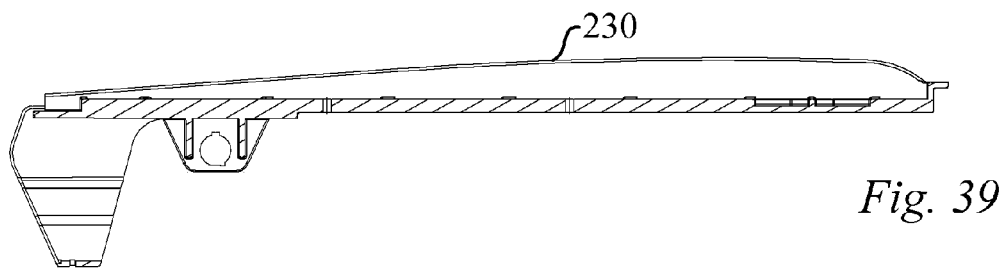
FIG. 39 shows a cross-sectional view of an embodiment of a topper insert of the adjustable sliding armrest, not to scale.
Figure 40:
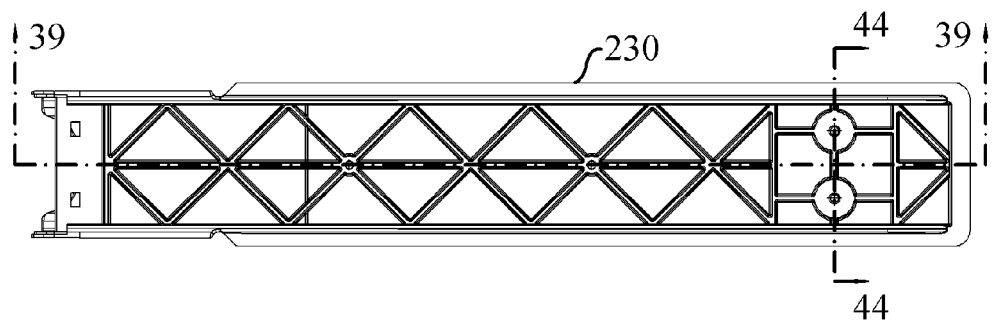
FIG. 40 shows a top plan view of an embodiment of a topper insert of the adjustable sliding armrest, not to scale.
Figure 41:
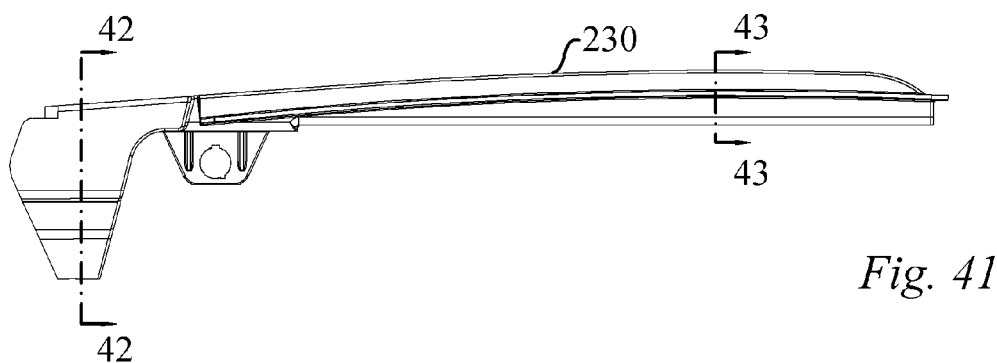
FIG. 41 shows a side elevation view of an embodiment of a topper insert of the adjustable sliding armrest, not to scale.
Figure 42:
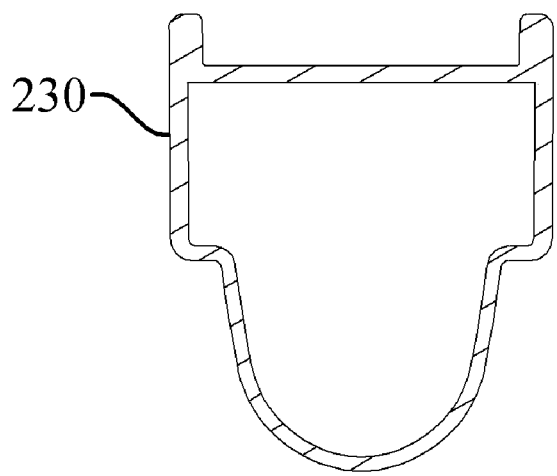
FIG. 42 shows a cross-sectional view of the topper insert taken along section line 42-42 of FIG. 41, not to scale.
Figure 43:
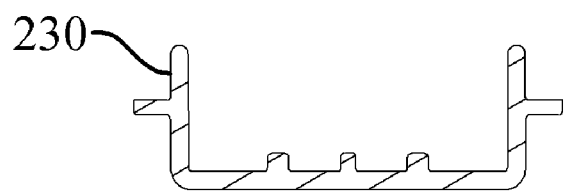
FIG. 43 shows a cross-sectional view of the topper insert taken along section line 43-43 of FIG. 41, not to scale.
Figure 44:
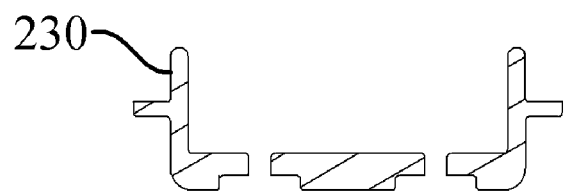
FIG. 44 shows a cross-sectional view of the topper insert taken along section line 44-44 of FIG. 40, not to scale.

The next component of the tilt adjusting mechanism (400) is a threaded rod (420). The threaded rod (420) is configured to extend through the rod bore (116) of the support member (100) and the handle bore (412). Preferably, the threaded rod (420) is constructed of a durable metal material, such as titanium alloys, carbon steel, stainless steel, and 41L40 alloy steel. As seen in FIGS. 2 and 30, the unthreaded portion of the threaded rod (420) has a cross-sectional geometry that mates with the cross-sectional geometry of the handle bore (412) such that when the rotating handle (410) is rotated, the threaded rod (420) will simultaneously rotate. In the particular embodiment shown in many of the figures, the cross-sectional geometry is hexagonal; however, one with skill in the art will appreciate that other cross-sectional geometries may be utilized, such as triangular, square, pentagonal, or star shaped, just to name a few. In a preferred embodiment, the cross-sectional geometry is round, as seen well in FIG. 2a, and may be fitted with, as would be known to one skilled in the art, whatever shaped fitting is most convenient in coupling the rotating handle (410) and the threaded rod (420). By way of example only, as is illustrated in FIG. 2a, the threaded rod (420) may have a keyed end to cooperate with a suitably cooperating keyway in the rotating handle (410). Obviously, the location of the key need not be on the threaded rod (420) and keyway need not be on the rotating handle (410), as the converse may well be preferred.

Figure 49:
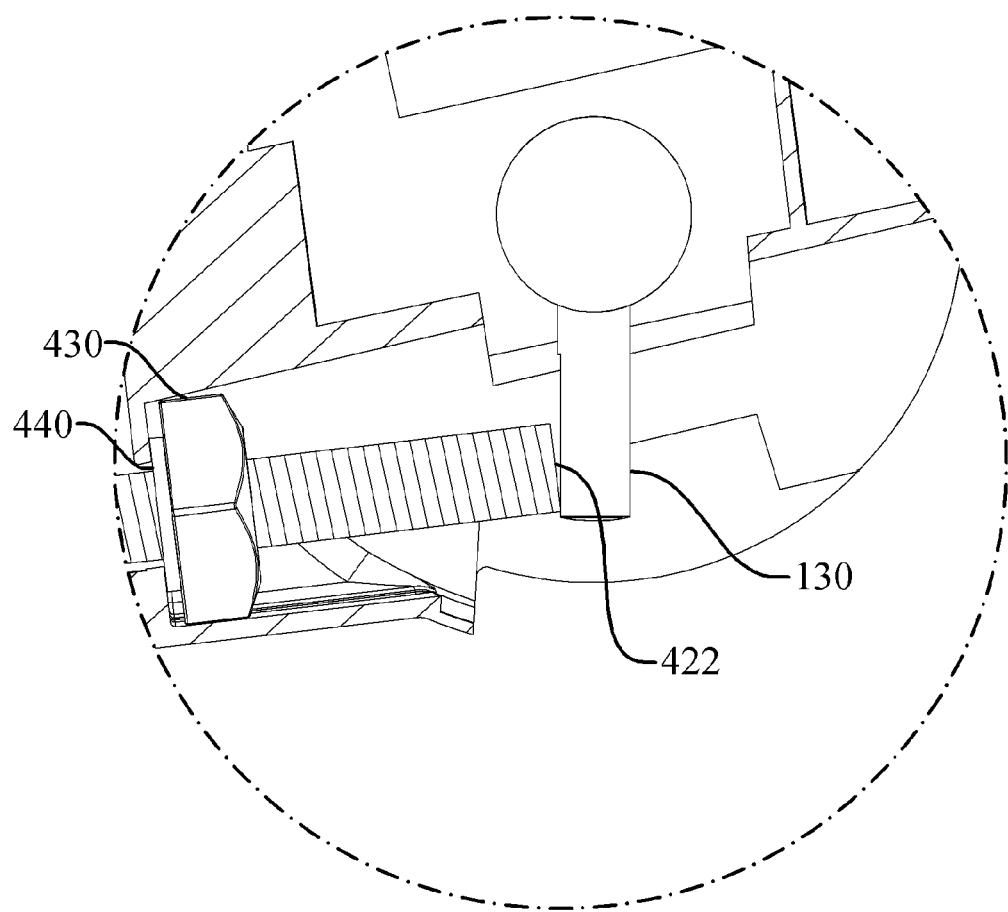
FIG. 49 shows an enlarged view of an embodiment of a threaded rod engaging a bearing pin of the adjustable sliding armrest, not to scale.
Figure 50:
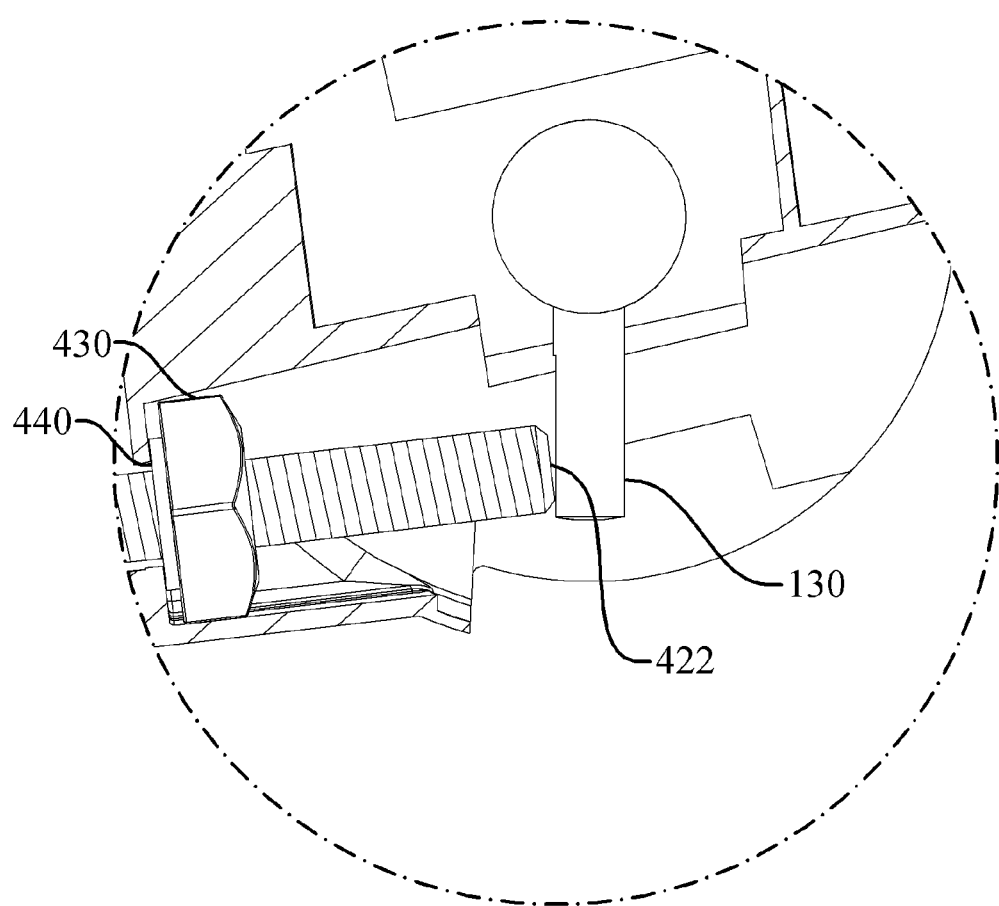
FIG. 50 shows an enlarged view of an embodiment of a threaded rod engaging a bearing pin of the adjustable sliding armrest, not to scale.
Figure 51:
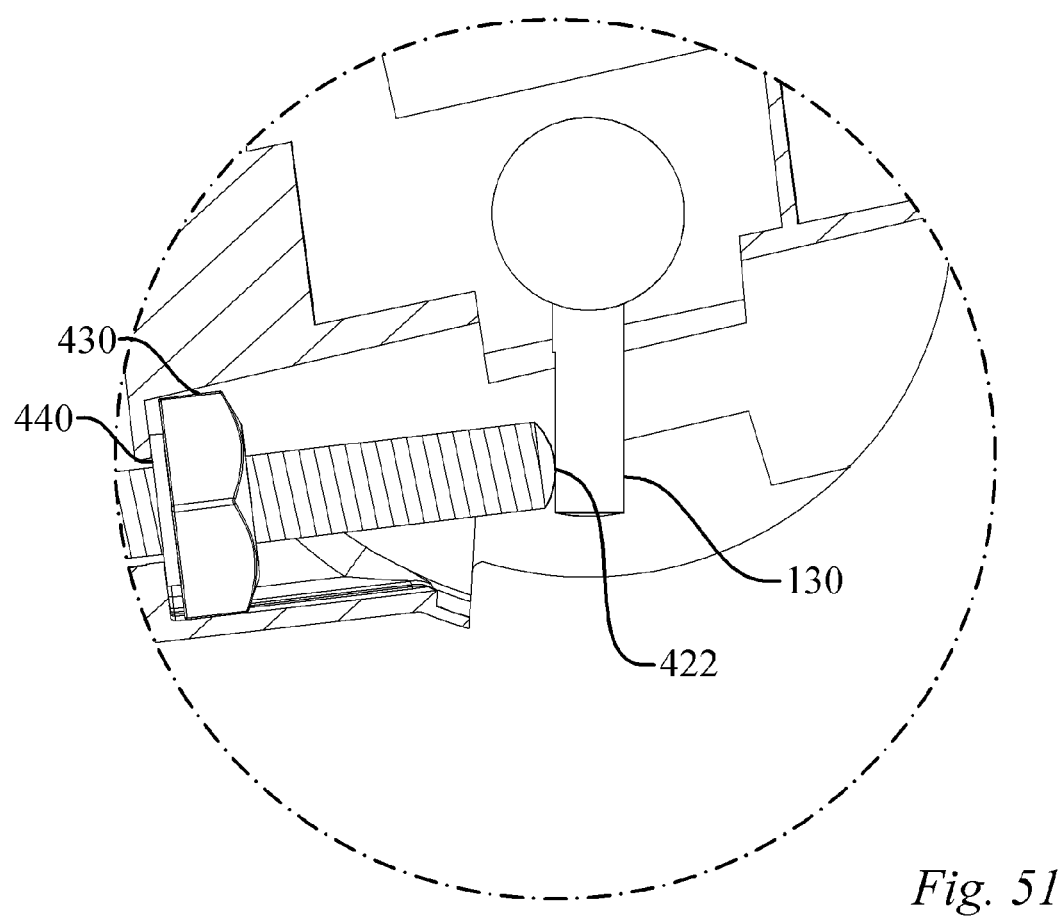
FIG. 51 shows an enlarged view of an embodiment of a threaded rod engaging a bearing pin of the adjustable sliding armrest, not to scale.

As seen in FIGS. 46-51, the threaded rod (420) has a contact surface (422) for engaging the bearing pin (130). The contact surface (422) may have a number of configurations. For example, the contact surface (422) may be flat, as seen in FIG. 49, or beveled, as seen in FIG. 50, or rounded, as seen in FIG. 51. Preferably, the contact surface (422) is rounded. A rounded or domed contact surface (422) allows the force exerted by the threaded rod (420) to be distributed over a larger surface area of the bearing pin (130), which helps increase the useful life of the bearing pin (130). Furthermore, because the rounded contact surface (422) has no sharp edges, there will be less scoring of the bearing pin (130) over time when compared to the flat and beveled contact surfaces (422).

In addition, the configuration of the bearing pin (130) itself may help reduce the concentration of stress forces exerted by the threaded rod (420). For example, in one embodiment, the bearing pin (130) includes a groove (132), as seen in FIG. 2. The groove (132) may be formed by removing a small portion of the bearing pin (130) by milling or grinding. The groove (132) may create a flat surface against which the contact surface (422) may bear. The flat surface created by the groove (132) will allow even more of the stress forces to be distributed over a larger surface area of the bearing pin (130), as opposed to simply a round bearing pin (130).

In an alternative embodiment, the contact surface (422) may bear directly against the pivot tube (120). In this particular embodiment, a separate bearing pin (130) would not be required. The pivot tube (120) may also be provided with a groove similar to the bearing pin groove (132) discussed above. Such a groove would provide a similar reduction in stress force concentration.

Referring now to FIG. 2 and FIGS. 46-51, the tilt adjusting mechanism (400) includes a nut (430) configured to engage the threaded rod (420). In one embodiment, the nut (430) may be fixed within the support member (100). For example, the nut (430) may be a square nut (430) that fits within a square shaped recess of the support member (100) to prevent rotation of the square nut (430). In another embodiment, a c-clip (440) is placed on the threaded rod (420) to help secure the nut (430) on the threaded rod (420) and to provide a biasing force against the nut (430) to ensure a good fit between the threads of the threaded rod (420) and the nut (430). In yet other embodiments, the nut (430) may be molded, press-fit, or retained by tabs or other mechanical restraints within the square shaped recess of the support member (100), as could easily be imagined by one skilled in the art. In such embodiments, as may be seen in FIG. 2a, it may be seen that the c-clip (440) is not required.

In an alternative embodiment, the support member (100) may include a threaded bore configured to engage the threaded rod (420). By utilizing a threaded bore in the support member (100), a nut (430) will not be required for the tilt adjusting mechanism (400) to function.

Now, the operation of the tilt adjusting mechanism (400) will be described. The tilt adjusting mechanism (400) is capable of adjusting the tilt angle of the armrest (10) by translating rotational motion to linear motion. For example, a user rotates the rotating handle (410) in a clockwise direction. The rotation of the rotating handle (410) causes the threaded rod (420) to rotate within the nut (430), or threaded bore. Because the nut (430), or threaded bore, is stationary, the threaded rod (420) translates rearward causing the armrest (10) to pivot upward about the pivot tube (120), thereby increasing the tilt angle, as seen in FIG. 46. Similarly, counterclockwise rotation of the rotating handle (410) causes the threaded rod (420) to translate forward causing the armrest (10) to pivot downward about the pivot tube (120), thereby decreasing the tilt angle, as seen in FIG. 48.

It may thus be appreciated that the adjustable sliding armrest (10) provides a number of advantages. For example, the sliding feature of the armrest (10) allows users of various arm lengths to adjust the armrest to their comfort. Additionally, the configuration of the slide member (200) and the support member (100) promotes a self-cleaning function to help prevent fouling of the slidable communication therebetween. The adjustable sliding armrest (10) further promotes ergonomics by utilization of the tilt adjusting mechanism (400), which allows for selective, incremental adjustments to the armrest (10) tilt angle. Moreover, the rounded or domed contact surface (422) of the threaded rod (420) helps distribute the force exerted on the bearing pin (130) over a larger surface area, which helps increase the useful life of the bearing pin (130).

Numerous alterations, modifications, and variations of the preferred embodiments disclosed herein will be apparent to those skilled in the art and they are all anticipated and contemplated to be within the spirit and scope of the disclosed adjustable sliding armrest (10). For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the adjustable sliding armrest (10) are described herein, it is to be understood that the practice of such additional modifications and variations and the equivalents thereof, are within the spirit and scope of the adjustable sliding armrest (10) as disclosed herein. Although some materials of construction were discussed for the various components of the adjustable sliding armrest (10), it should be noted that some of the components, when used in particular applications, must meet certain safety codes and regulations. For example, when used in an automobile, the specific materials of construction of various components may be restricted by Federal Motor Vehicle Safety Standard (FMVSS) 302 for Flammability of Interior Materials. The corresponding structures, materials, acts, and equivalents of all means or step plus function elements in the claims below are intended to include any structure, material, or acts for performing the functions in combination with other claimed elements as specifically claimed.

I claim:

1. An adjustable armrest comprising:
a support member having a plurality of first locking apertures defined in a first side wall of the support member;
a slide member slidably attached to the support member; and
a first adjustable mechanism to allow selective slidable movement of the slide member with respect to the support member, the first adjustable mechanism having a biasing mechanism to bias a locking mechanism into one of the plurality of first locking apertures,
wherein the first adjustable mechanism includes a first button configured to extend through a first bore defined on a first side of the slide member and the plurality of first locking apertures, and wherein the support member further includes a plurality of second locking apertures defined in a second side wall of the support member, and wherein the biasing mechanism biases the locking mechanism to one of the plurality of second locking apertures.

2. The adjustable armrest of claim 1, wherein the first adjustable locking mechanism further includes a second button configured to extend through a second bore on a second side of the slide member and the plurality of second locking apertures, and wherein the biasing mechanism is disposed between the first button and the second button.

3. The adjustable armrest of claim 2, wherein applying a compressive force to the first button and to the second button causes the biasing mechanism to compress such that the first button disengages from one of the plurality of first locking apertures and the second button disengages from one of the plurality of second locking apertures allowing the locking mechanism to slide along a first slot defined in the first side wall in the support member and a second slot defined in the second side wall of the support member until the biasing mechanism biases the first button into engagement with a different one of the plurality of first locking apertures and the second button into engagement with a different one of the plurality of second locking apertures to lock the position of the slide member with respect to the support member.

4. The adjustable armrest of claim 1 further comprising a second adjusting mechanism for selectively increasing or decreasing a tilt angle.

5. The adjustable armrest of claim 4, wherein the second adjusting mechanism includes a rotating device disposed within a recess of the support member, a threaded rod having a first end engaging the rotating device and a second end engaging a pin attached to a pivot tube disposed in a pivot bore defined in the support member.

6. The adjustable armrest of claim 5, wherein rotation of the rotating device causes the threaded rod to rotate such that the threaded rod translates forward or rearward to allow rotation of the support member about the pivot tube to selectively decrease or increase the tilt angle.

7. The adjustable armrest of claim 6, wherein the pivot tube extends beyond the support member to thereby attach the support member to an object.

8. An adjustable armrest comprising:
a pivotable support member having a bottom wall and a recess defined in the bottom wall;
a slide member slidably attached to the support member
a locking mechanism to adjust movement of the slide member with respect to the support member; and
a tilt adjusting mechanism to selectively adjust a tilt angle of the support member.

9. The adjustable armrest of claim 8, wherein the tilt adjusting mechanism includes a rotating handle disposed within the recess of the support member, a threaded rod having a first end engaging the rotating handle and a second end engaging a pin attached to a pivot tube disposed in a pivot bore defined in the support member.

10. The adjustable armrest of claim 9, wherein rotation of the rotating handle causes the threaded rod to rotate such that the threaded rod translates forward or rearward to allow rotation of the support member about the pivot tube to selectively decrease or increase the tilt angle.

11. The adjustable armrest of claim 10, wherein the pivot tube extends beyond the support member to thereby attach the support member to an object.

12. The adjustable armrest of claim 8, wherein the pivotable support member includes a plurality of first locking apertures defined in a first side wall of the support member and a plurality of second locking apertures defined in a second side wall of the support member.

13. The adjustable armrest of claim 12, wherein the locking mechanism includes a biasing spring to bias the locking mechanism into one of the plurality of first locking apertures and one of the plurality of second locking apertures.

14. The adjustable armrest of claim 13, wherein the locking mechanism includes a first button configured to extend through a first bore defined on a first side of the slide member and the plurality of first locking apertures, and a second button configured to extend through a second bore on a second side of the slide member and the plurality of second locking apertures, and wherein the biasing spring is disposed between the first button and the second button.

15. The adjustable armrest of claim 14, wherein applying a compressive force to the first button and to the second button causes the biasing spring to compress such that the first button disengages from one of the plurality of first locking apertures and the second button disengages from one of the plurality of second locking apertures allowing the locking mechanism to slide along a first slot defined in the first side wall of the support member and a second slot defined in the second side wall of the support member until the biasing spring biases the first button into engagement with a different one of the plurality of first locking apertures and the second button into engagement with a different one of the plurality of second locking apertures to lock the position of the slide member with respect to the support member.

16. A method of adjusting an armrest comprising:
providing an adjustable armrest having a pivotal support member and a slide member slidably movable with respect to the support member;
compressing a locking mechanism within the support member to disengage the locking mechanism from a plurality of first locking apertures;
positioning the slide member along the support member;
engaging the locking mechanism with a different one of the plurality of first locking apertures; and
compressing the locking mechanism within the support member to disengage the locking mechanism from a plurality of second locking apertures and engaging the locking mechanism with a different one of the plurality of second locking apertures.

17. The method of claim 16, wherein prior to engaging the locking mechanism with a different one of the plurality of first locking apertures and a different one of the plurality of second locking apertures, the method further comprising releasing the locking mechanism.

* * * * *